(12) United States Patent
Healey et al.

(10) Patent No.: US 8,452,172 B2
(45) Date of Patent: May 28, 2013

(54) TESTING AN OPTICAL NETWORK

(75) Inventors: Peter Healey, Ipswich (GB); Philip A Barker, Ipswich (GB)

(73) Assignee: British Telecommunications public limited company, London (GB)

( * ) Notice: Subject to any disclaimer, the term of this patent is extended or adjusted under 35 U.S.C. 154(b) by 851 days.

(21) Appl. No.: 12/527,819

(22) PCT Filed: Feb. 26, 2008

(86) PCT No.: PCT/GB2008/000644
§ 371 (c)(1),
(2), (4) Date: Aug. 19, 2009

(87) PCT Pub. No.: WO2008/104759
PCT Pub. Date: Sep. 4, 2008

(65) Prior Publication Data
US 2010/0014854 A1  Jan. 21, 2010

(30) Foreign Application Priority Data
Feb. 28, 2007 (EP) .................................... 07250847

(51) Int. Cl.
*H04B 10/08* (2006.01)
(52) U.S. Cl.
USPC .................................... 398/9; 398/16; 398/25
(58) Field of Classification Search
USPC .................................................... 398/10–339
See application file for complete search history.

(56) References Cited

U.S. PATENT DOCUMENTS

| | | | |
|---|---|---|---|
| 4,278,850 A | 7/1981 | Sato et al. | |
| 5,436,987 A * | 7/1995 | Saito et al. | 385/16 |
| 6,418,195 B1 * | 7/2002 | Autry et al. | 379/21 |
| 6,758,693 B2 * | 7/2004 | Inagaki et al. | 439/577 |
| 7,234,880 B1 * | 6/2007 | Charny et al. | 385/92 |
| 7,412,165 B1 * | 8/2008 | Collier et al. | 398/16 |
| 7,772,975 B2 * | 8/2010 | Downie et al. | 340/572.1 |
| 2003/0021580 A1 | 1/2003 | Matthews | |
| 2006/0268759 A1 | 11/2006 | Emery et al. | |
| 2007/0242954 A1 * | 10/2007 | Sackman | 398/71 |

OTHER PUBLICATIONS

International Search Report for PCT/GB2008/000644, mailed Jun. 4, 2008.

* cited by examiner

*Primary Examiner* — Dzung Tran
(74) *Attorney, Agent, or Firm* — Nixon & Vanderhye P.C.

(57) ABSTRACT

The present invention relates to testing a passive optical network having a head end and a plurality of terminals, which terminals are connected to the network at a respective plug and socket arrangement located at customer premises. A test device is provided having a standard plug for connection in place of a terminal in the socket of the relevant customer premises. An identification device is provided in the socket. The test device is arranged to (i) read the identity of the identification device and (ii) test the line and transmit a result to the head end together with the identity so that the line to the customer premises can be tested remotely. When the line has been tested, the test device can be removed. Because the test device uses an existing connection, the optical (insertion) loss is reduced.

15 Claims, 4 Drawing Sheets

TESTING AN OPTICAL NETWORK

This application is the U.S. national phase of International Application No. PCT/GB2008/000644, filed 26 Feb. 2008, which designated the U.S. and claims priority to Europe Application No. 07250847.6 filed 28 Feb. 2007, the entire contents of each of which are hereby incorporated by reference.

BACKGROUND AND SUMMARY

The present invention relates to testing an optical network, in particular using a test device that is releasably connectable to connector apparatus.

In known optical networks, in particular so-called Passive Optical Networks or PONs, data is broadcast from a head end to a plurality of terminals in a downstream direction. In an upstream direction, that is, towards the head end, data is passively multiplexed. The terminals, which transmit optical data upstream to the head end, are normally configured to transmit data in response to scheduling instructions from the head end. The scheduling instructions control the timing of the data transmissions from the terminals such that data from different terminals is unlikely to overlap.

The terminals are normally installed within customer premises, and will normally be connected to the optical network outside the premises by a standard plug and socket connector.

It can be useful for a network operator to test the network centrally, for example at the head end, by monitoring signals from the terminals. However, if a fault is detected, it can be difficult to determine whether the fault is due to the optical network, or to a terminal. This difficulty can be particularly important if the operator is not responsible for the maintenance of the optical network unit or for other components within the customer premises.

Normally, devices connected to optical networks are electrically powered from the mains supply. Although it is known to derive optical power from an optical source using a photovoltaic device or other solar cell, this is not always convenient.

According to one aspect of the present invention, there is provided a testing system having: connector apparatus for releasably connecting an optical network to a terminal unit, the connector apparatus having an identifier associated therewith, and an identifier circuit for providing an identification signal, which identification signal is indicative of the identifier associated with the connector apparatus; and, a test device that is releasably connectable to the connector apparatus, the test device being operable in use with the connector apparatus to measure at least one characteristic of an optical signal from the optical network, and to transmit a test signal, which test signal includes an indication of the measured characteristic(s) and an indication of the identifier associated with the connector apparatus.

According to another aspect of the present invention, there is provided a method of testing an optical network arranged to broadcast optical signals to a plurality of network connector devices, including the steps of: receiving an optical signal at a connector device; measuring one or more characteristics of the optical signal using a testing device; and, converting optical power in the optical signal into electrical power; and powering the testing device with the converted optical power.

BRIEF DESCRIPTION OF THE DRAWINGS

The invention will now be further described, by way of example only, and with reference to the following drawings in which.

DETAILED DESCRIPTION OF PRESENT EXAMPLE EMBODIMENTS

Figure 1:
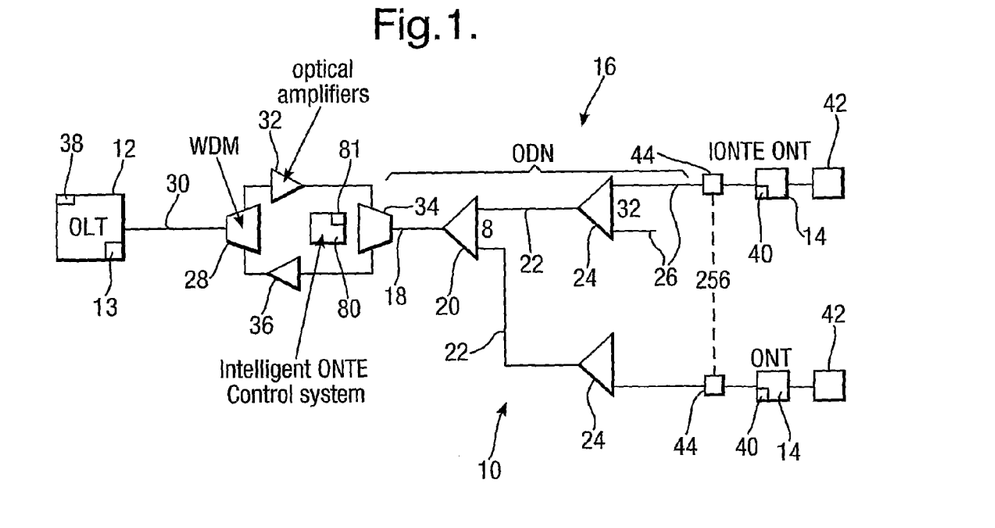
FIG. 1 shows a schematic view of an optical network according to the present invention.

FIG. 1 shows a passive optical network (PON) 10 in which a head end (OLT) 12 having an optical source 13 broadcasts, in a downstream direction, information in the optical domain to a plurality of terminals (ONT) devices 14 over an optical distribution network (ODN) 16. The head end 12 also receives information from the terminals 14 in the upstream direction. The ODN is formed in a tree like structure, having a trunk optical fibre 18 connected to a first level passive optical splitter 20, which splitter distributes the incoming light from the trunk fibre 18 to a plurality of branch optical fibres 22. In the example of FIG. 1, the first level splitter 20 has an 8-way split, and couples light from the trunk fibre to eight branch fibres, although only two are shown for clarity.

Each branch fibre from the first level splitter 20 is connected to a respective second level splitter 24, which second level splitter distributes the light from each branch to a plurality of further branches 26, each further branch being connected to a respective ONT. Each further splitter has a split of 32, such that the head end 12 is connected to 256 terminals 14. However, further levels of split may be provided so that a greater number of terminals can be connected to the head end.

In order that transport in the upstream and downstream directions can be achieved over a common fibre path, different upstream and downstream wavelength channels are provided for the upstream and downstream directions respectively. A first WDM wavelength division multiplexer device 28 is connected to head end 12 over an optical link 30, for directing light in a downstream channel from the head end to a downstream amplifier 32, for amplifying the light from the head end, which light may have suffered attenuation to the length of the optical fibre link 30, since this link may be between 50 and 100 kilometers, or longer. The first WDM device 28 also serves to couple light from the upstream wavelength channel to the optical length 30. A second WDM device 34 is provided for coupling upstream light from the branch fibre 18 to an upstream amplifier 36, and for directing the downstream channel to the trunk optical fibre 18. Thus, the first and second WDM devices 28, 34 allowing light in the upstream and downstream directions to be separated so that each upstream and downstream channel can be individually amplified by a respective one of the upstream and downstream amplifiers 32, 36.

With regard to transport in the upstream direction, the head end has a scheduler stage 38 for controlling the timing of signals from the respective terminals 14, such that there is essentially no risk or a reduced risk) that upstream signals from one terminal will collide with signals from another terminal where optical paths are combined at a splitter. The terminals are configured to transmit short bursts of data in response to control signals from the head end, the scheduler stage 38 of the head end being arranged to perform a scheduling function such that the transmission of bursts are timed so as not to overlap. Hence, data from the different OLTs is passively multiplexed (in this example temporally, that is, in a time-division manner), in the normal way of a PON.

The control signals from the head end contain an instruction for a given terminal to transmit data for a predetermined duration (or equivalently to transmit a predetermined number of bursts) at a predetermined time, either with respect to a centralised time or with respect to the arrival time of a control signal. Accordingly, each terminal has a respective timing unit 40 for measuring the time at which a data burst is to be transmitted in response to a control signal from the head end. Each terminal 14 will normally be connected to customer equipment such as telephony equipment or other communications equipment 42, and will be arranged to buffer data from the customer equipment in order to transmit it at the correct time in the upstream direction.

The terminals each have an address associated therewith, and the head end is arranged to transmit instructions which associate given data with a given address. Each terminal is arranged to monitor the broadcasts information from the head end, and to capture data addressed to it towards the correct customer equipment. Thus, the terminals each act as an interface between customer equipment and the optical distribution network 16. A given terminal 14 may have a plurality of customer equipment unit, associate therewith, each of which is connected to irespective output (not shown) of the terminal 14, the terminal having a routing capability for routing data from the head end to the different customer equipment units. Typically, a terminal will have an electrical interface for transmitting or receiving data to/from the or each customer unit, although an interface having at least some optical outputs or inputs may be provided.

Between the ODN 16 and each terminal 14, there is provided a respective optical network interface unit 44 (also referred to an intelligent ONTE or IONTE). Such an interface unit is shown in more detail in FIG. 2. The interface unit 44 includes a housing 46 having a fixing means such as screw holes 48 for receiving respective screws so that the housing can be fixedly mounted on a surface, for example a wall surface 50 in the manner of a conventional telephone or electrical mains sockets.

Figure 2:
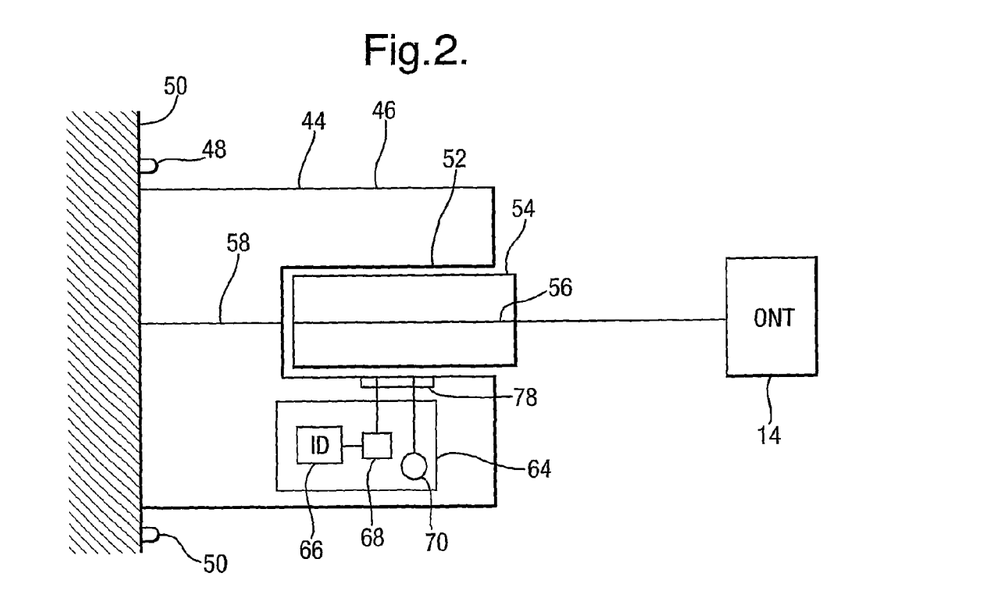
FIG. 2 shows an interface unit schematically, having a conventional plug connected thereto.

The housing 46 has a socket region 52 for realisably receiving a plug 54, which plug is arranged to retain the end portion 56 of an optical fibre connected to the relevant terminal 14. A tubular support is provided within the housing for retaining the end portion of an optical feed fibre 58 leading to the optical distribution network. The plug 54 and the socket region 52 are arranged to cooperate such that when the plug is received in the socket, the respective optical fibres 56, 58 of the plug and the socket are in registry with one another. Thus, when the socket is in place in the plug light from the ODN can flow to the relevant terminal, and vice versa. Because the plug is releasable from the socket, a user can disconnect the terminal from the ODN, and take the terminal to another interface unit at a different location, in a similar way to which a conventional telephone can be moved from one telephone socket to another.

Figure 3:
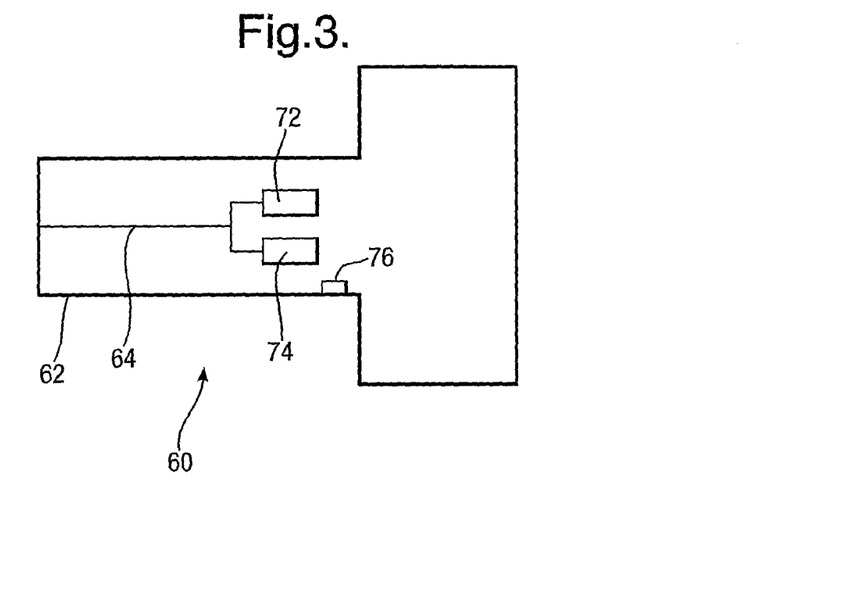
FIG. 3 shows a test device suitable for connecting to the interface unit of FIG. 2 in place of the conventional plug.

When the terminal plug 54 is removed from the interface unit 44, a removable test device 60 as shown in FIG. 3 may be connected to the interface unit 44 instead. The removable test device 60 includes a plug portion 62 with an optical fibre portion 64 retain therein. The plug portion 62 is of similar shape to the terminal plug 54, so that when the plug portion 62 of the removable test device is received in the correspondingly shape socket region 52 of the interface unit, the respective fibre portions of the interface unit and the removable test device are in registry, allowing the test device to be optically coupled to the optical distribution network 16. The removable test device will typically be a small, hand held device, so that a use can easily change the interface unit from (i) a test state in which the test device is connected to the interface unit to, (ii) an operational state in which the interface unit is connected to the relevant ONT, the change of state being achieved by removing the test device from interface unit and introducing in its place the ONT plug.

The removable test device 60 has a photodiode device 72 coupled to an output of the optical fibre portion 64 so as to receive downstream light from the optical distribution network exiting the fibre portion 64. The photodiode can be arranged to receive light at a test wavelength which is different from the operational (data carrying) wavelength of the PON, so that the test wavelength does not interfere with normal operation of the PON. The photodiode can also be arranged to received light at the PON operating wavelength. In addition, the removable test device 60 has a modulator device 74 also optically coupled to the optical fibre portion 64, so that modulated upstream signals can be transmitted into the ODN 16.

Returning to FIG. 2, the interface unit 44 has an electronic circuit which includes: an electronic identity chip 66 having an identifier stored therein; a controller stage 68 having one or more processors and one or more memory devices for processing and storing data; and, a power source 70. The electronic circuit 64 is connected to an electrical contact region 78 mounted on an external surface of an interface unit housing, the contact regions 76, 78 being positioned on the interface unit 44 and the removable test device 60 such that when the removable test device 60 is received in the socket region 52 of the interface unit 44, the respective contact regions 76, 78 of the removable test device and the interface unit are engaged with one another and to form a releasable electrical connection (although instead of a releasable electrical connection, a magnetic or radio interface may be provided).

The controller stage 68 is arranged to detect that an electrical contact to the removable test device 60 is formed, (from which contact it can be inferred that the test device 60 is inserted into the socket region 52 and is therefore optically coupled to the ODN 16). When such a contact is formed, the controller stage 68 monitors the electrical signal from the photodiode 72 and retrieved the identifier from the identity chip 66, and controls the modulated device 74 so as to provide a modulated optical test signal at a test wavelength for upstream transmission (for example in a window around 1625 nm which is sufficiently removed from the operational wavelengths of the PON (operating at for example, 1260 nm-1360 nm upstream and 1480 nm-1500 nm downstream) for the test signals not to affect transport of the PON. The test signals include: the identifier obtained from the identity chip; and, an indication of the PON optical power from the head end received at the interface unit based on a reading from the photodiode 72. The indication of optical power may be a continuous variable, or may be quantized, or may simply indicate whether the power is above a threshold deemed necessary for PON operation.

The test signal is encoded by the controller stage 68 and transmitted in short bursts. The encoding could be based on an ALOHA-like protocol implemented preferably without provision for collision detection at the interface unit. This is acceptable not to provide for collision detection because the data from the interface unit is not time critical and can have a very high probability that it will get through without collision after a few attempts, since the controller stage is arranged to transmit short burst separated by relatively large random delays between transmissions and to re-transmit data (e.g.; ID, PON power, battery status, temperature, etc) at random intervals. The data from an interface unit is expected to remain stable for very long periods (many hours) so the occasional loss of a packet is not critical. When collisions do occur, the centralised controller will be able to detect this my monitoring for data corruptions (e.g., by detecting parity errors) and then discard this data. Obviously, the respective controller stages of the interface units are each need to encode their data prior to transmission with a suitable error detection/correction coding scheme. The benefits of not employing collision detection at the interface unit 44 are that is avoids the need for a data receiver and therefore reduces the interface unit cost and power consumption. The interface unit data packets are likely to be of very short duration (of order milliseconds) separated by random time intervals of order minutes. The data burst in a packet could be at rates ranging from ~100 kbps to several Mbps.

The test signals may also include status data such as an indication of the energy available from the power source 70 and data indicative of the result of other self diagnostic tests. In addition, the electronic circuit 64 may include one or more environmental sensors such as a temperature sensor, and the controller stage may be configured to include local environmental data in the test signals such as the temperature of housing 46.

Monitoring apparatus is provided in the optical distribution network for receiving the test signals from the respective interface units 44. In the present example the monitoring apparatus has the form of a central monitoring unit 80 connected to the second WDM device 34, so that the WDM device can separate the test signals at the test wavelength from the PON signals at the PON operating wavelength, and consequently direct the test signals to the central monitoring unit 80. An electrical or other link (not shown) may be provided between the central monitoring unit 80 and the location of the head end 12, so that the central monitoring unit can be controlled or otherwise accessed remotely from the head end.

The central monitoring unit 80 could be located at a different point in the network where the fibre paths from the different interface units 44 is shared, such as at the head end, located for example in a central station or exchange. Nevertheless, connecting the central monitoring unit 80 to an existing WDM device reduces the need for an additional WDM device for separating the test signals from those of the PON.

When the removable test device 60 of a given interface unit 44 is connected thereto, the fibre path to and from that interface unit can be tested centrally, at the central monitoring unit. This is particularly convenient because a network operator can test a path before offering service; once the path has been tested and a customer wishes to connect a terminal device, the customer can simply remove the removable test device 60 and, in its place, insert the plug connector 54 of the terminal. Clearly, the removable test device 60 is intended to be only temporarily connected to the PON.

Figure 4:
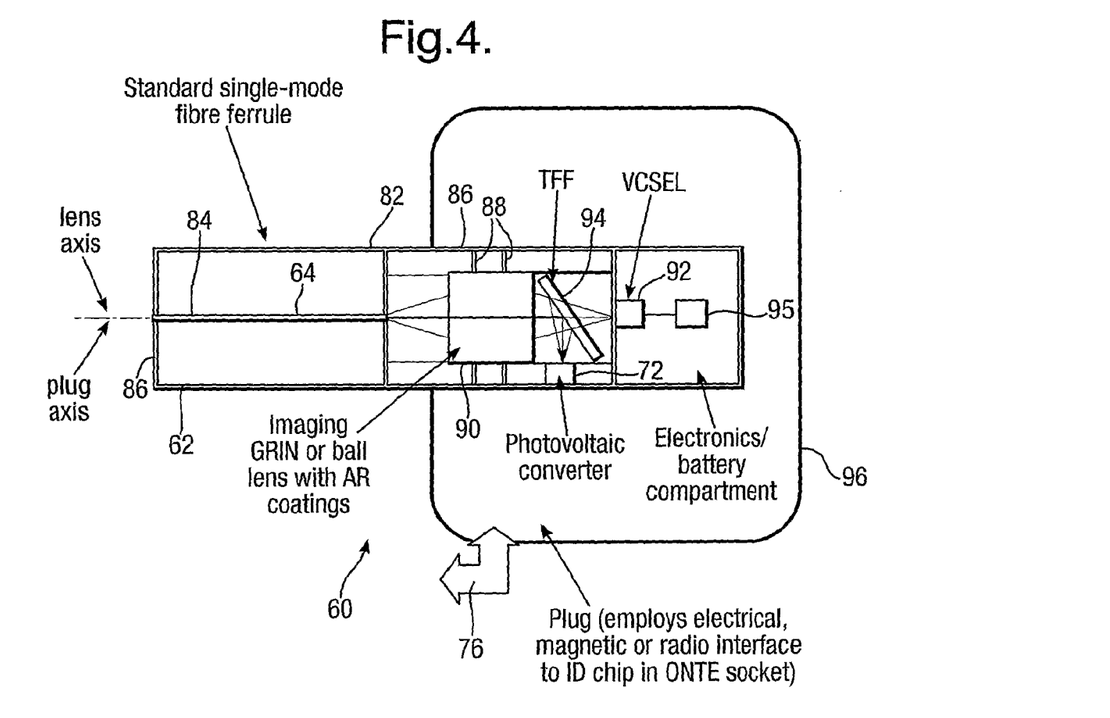
FIG. 4 shows a more detailed view of the test device of FIG. 3 according to one embodiment.

FIG. 4 shows in more detail one embodiment of the removable test device 60 (components corresponding to those of FIG. 3 are given corresponding numerals). Here, the plug portion 62 is formed according to the dimensions of a standard single-mode fibre connector. The plug portion 62 comprises a connector ferrule 82, with a bore 84 for retaining a single-mode fibre portion. The socket region 52 of the interface unit 44 is arranged to guide the ferrule into position as the ferrule is inserted into the socket such that when the forward face of the ferrule 86 abuts an end wall of the socket region 52, the optical fibre portion 64 is in close optical coupling with the feed fibre 58 of the interface unit 44. The ferrule is housed within a cylindrical casing 86, which casing has internal supports 88 for retaining a lens element, here a graded refractive index (GRIN) lens 90, axially aligned with the optical fibre portion 64. The lens 90 is arranged to focus light from an optical source, here a vertical cavity surface emitting laser (VCSEL) 92, into the fibre portion 64. A wavelength-splitting filter, here a thin film filter (TTF) 94 is provided between the lens 90 and the laser 92. The filter 94 is inclined at an angle to the axis of the lens 90, for example a 45 degree angle, so as to direct downstream light from the optical distribution network towards a photodiode, which here is operating as a photovoltaic converter 72.

The filter 94, which is largely transmissive at the test wavelength, is arranged to allow light from the laser 92 at the test wavelength to pass through the filter and onto the lens 90. However, the filter 94 is largely reflective at the PON operating wavelength, and so reflects downstream light from the optical distribution network onto the photovoltaic converter 72. Thus, the filter allows upstream light from the laser to be wavelength-multiplexed over the downstream light from the PON. The laser has a driver circuit 95 associated therewith for modulating the laser (or the driver could be within the controller 68), which driver circuit 95 is electrically connected to electrical contacts 76 on an outer surface of the casing 96 of the removable test device 60, so that the laser can provide modulated light in accordance with signals from the controller stage 68.

The controller stage 68 in each interface unit 44 is configured to transmit the test signals in short bursts of data at random intervals (the data for the test signals may but need not be collected at random intervals. The lengths of the intervals are chosen to be sufficiently large for the likelihood to be small that bursts from different interface units will collide. Such asynchronous method for the transmission of upstream test data is advantageous because the need for each removable test device to be addressed centrally is reduced.

Figure 5:
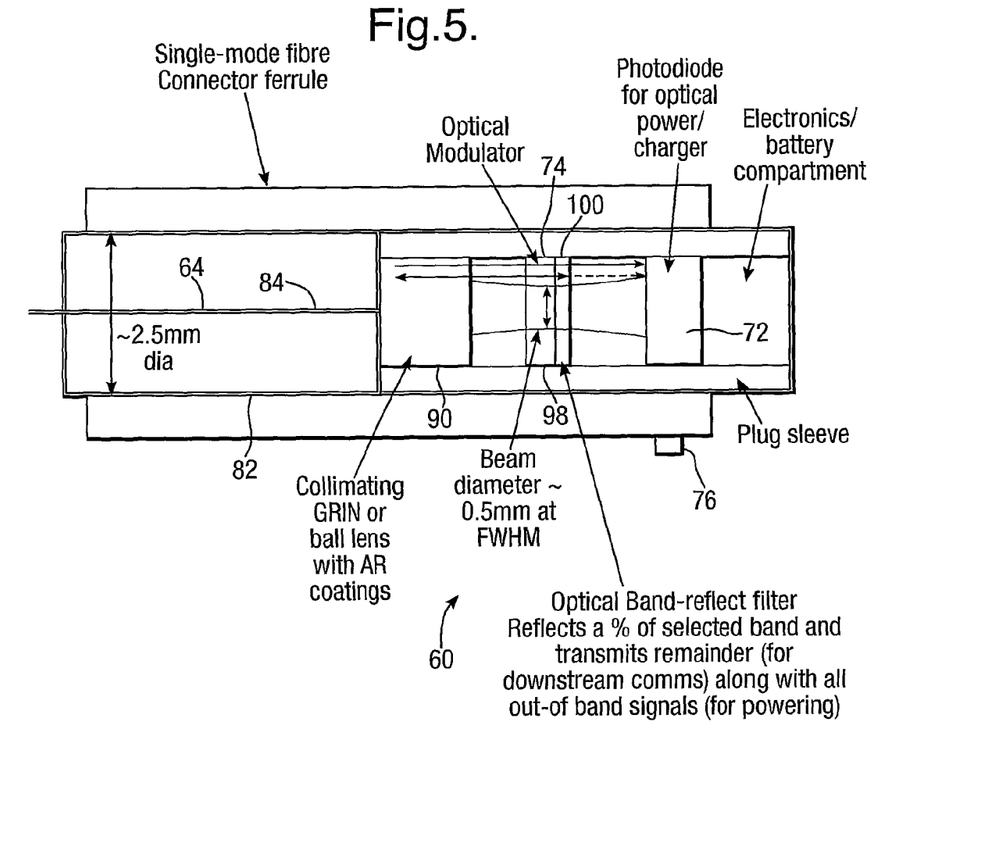
FIG. 5 shows a more detailed view of the test device of FIG. 3 according to a second embodiment.

In an alternative embodiment, a removable test device 60 as shown in FIG. 5 is employed. As with the previous embodiments, a ferrule 82 is provided with an optical fibre therein for optically connecting to the interface unit 44. However, instead of a modulated light source, the modulator device is formed by a reflection modulator 74 retained in axial alignment with the optical fibre portion 64. Between the reflection modulator 74 and the fibre portion 64, there is provided a collimating lens, here a graded refracted index lens (GRIN) lens 90, for expanding the light beam from the optical fibre 64 so that the cross sectional area light beam illuminates a significant proportion of the active area of the reflection modulator 74. Because a reflection modulator is employed in the embodiment corresponding to FIG. 5, a light source is required at an upstream location in the PON. Although in principle the light source 13 of the head end could be employed, the head end will be transmitting data at the operational frequency of the PON, which is several GHz. In order to process this signal, costly high speed electronic will be required in the interface unit 44, in particular since the interface unit will need to be scheduled in accordance with normal PON operation. Hence, in the embodiment of FIG. 5, a dedicated light source 81 operating at a test wavelength is provided in the monitoring unit for feeding each of the removable test devices 60. Although the test wavelengths in the upstream and downstream direction may be different wavelengths, a single wavelength will normally only be needed in this embodiment, since upstream and downstream signals at the test wavelength are unlikely to need amplification in view of the position of the central monitoring unit.

The reflection modulator 74 includes a modulating medium 98 such as a Liquid Crystal medium and a back reflecting layer 100, the back reflecting layer being arranged to only allow through a small proportion of light from the central monitoring unit 80 at the test wavelength (the remaining being reflected upstream), and for allowing a substantial amount of light at the PON operating wavelength to pass through. On the downstream side of the reflection modulator 74, there is provided a photodiode device (here a photovoltaic device) 72 which receives both the test signals and the PON signal. As in the previous embodiments, the modulator 98 and the photodiode are connected to external electrical contacts 76.

The electronic circuit 64 of the interface unit is configured to perform similar function to those described above in relation to the previous embodiments. However, instead of transmitting data in randomly timed bursts, it is preferred to address each interface unit from the central monitoring unit 80 with an invitation to return test data. Such an approach conveniently makes use of the light source in the central monitoring unit 80 which is required to provide the feeder signal.

The photodiode 72 may be used to both receive instructions from the central monitoring unit 80 at the test wavelength and monitor the incoming power level at the PON operating wavelength.

In a situation in which an interface is to receive instructions from the central monitoring unit 80, the central monitoring unit 80 is configured to transmit instructions modulated at low frequencies over the test wavelength. The electronic circuit 64 can then include receiver electronics (e.g., a receiver stage, not shown) which operate at low frequencies rather than PON operating frequency of several GHz, thereby limiting the cost and complexity of the interface unit. The receiver electronics which will effectively remove the signals at the PON operating frequencies (to the extent that the PON operating frequencies are not already filtered by the photodiode), are configured to pass the instructions from the central monitoring unit 80 to the controller stage 68, the controller stage being configured to transmit test data back to the central monitoring unit in response to these instructions. Clearly, as the signal intensity from the central monitoring unit is superposed on the PON signal intensity from the head end, the central monitoring unit signal should be sufficiently strong (for example at least about 5%) of the superposed signal intensity in order to be distinguishable.

In an alternative embodiment in which the interface units need to be controlled, the central monitoring unit may be arranged to impose a radio frequency subcarrier modulation on the PON signal from the head end source, for example by sending an electronic modulation signal over an electrical link (not shown) to the head end.

Figure 8:
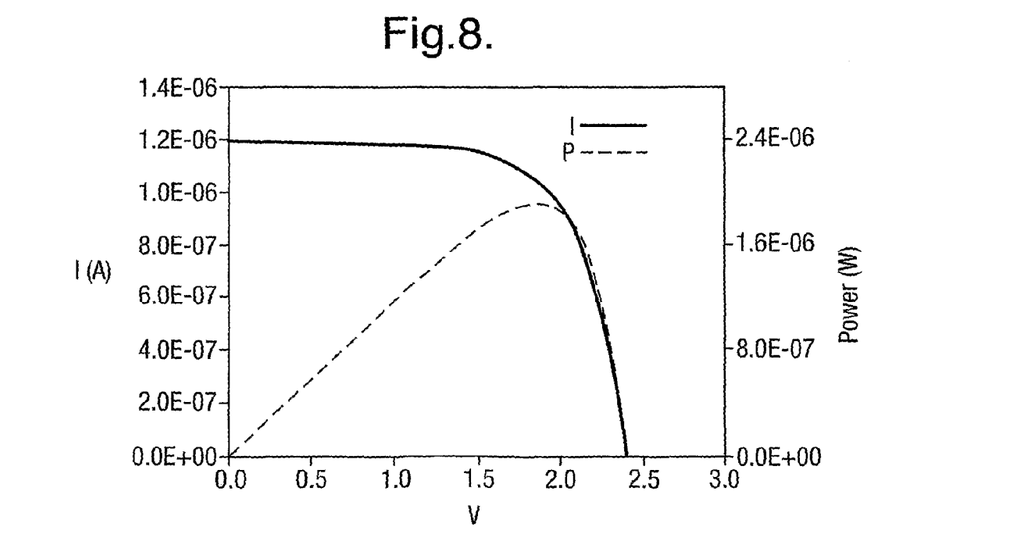

In the above embodiments, the photodiode 72 is used as a photovoltaic (PV) device (for an example of a photodiode having a design suitable for good photovoltaic properties, see: Willie W. N G, Kenichi Nakano et-al, "A monolithic GaInAs/InP photovoltaic power converter", IEEE transactions on Electronic Devices, Vol. ED-29, No. 9, September 1882. pp. 1449-1454). The controller stage 68 is arranged to load the photovoltaic device with a resistance such that the photovoltaic device provides a good level of electrical power to the controller stage 68, which electrical power is converted from the optical power arriving at the interface unit 44 from the head end (and also from the central monitoring unit 80 if this is configured to transmit to the interface unit). An example of current (I) versus voltage (V) characteristics of a PV device are shown in FIG. 8, together with the calculated power (dashed line).

The power source 70 is in this example is an energy storage device, in particular a re-chargeable energy storage device such as a re-chargeable battery having one or more cells, or possibly a capacitor or other device capable of absorbing and subsequently releasing electrical energy on a repeated basis. The energy storage device it will allow the controller stage 68 to draw power in short bursts, provided that when averaged over a suitably long period, the energy drawn by the electronic circuit 64 is less or equal to the energy provided by the photovoltaic device. In this way, the light from the PON can be used to power the interface unit 44, thereby reducing the need for an interface unit 44 to be connected to an external power source.

The power from the PON arriving at an interface unit will normally be very low, typically less than 50 micro watts and in the present example, between 10 and 20 micro watts. Nevertheless, the current provided by the PV device will be substantially proportional to the optical power incident on the PV device, and hence proportional to the optical power (and intensity) of light emerging form the interface unit 44. Therefore, the controller stage 68 is arranged to: (i) monitor the current flowing from the PV device, for example by monitoring the current across a load chosen to maximise power output as illustrated in FIG. 8; and (ii) use the current to power one or more processors, one or more memory devices and associated electronic circuitry used in its operation.

Because of the low level of power, the photovoltaic device in this example is formed from a plurality of photovoltaic cells, each of which is capable of generating power individually.

Figure 6:
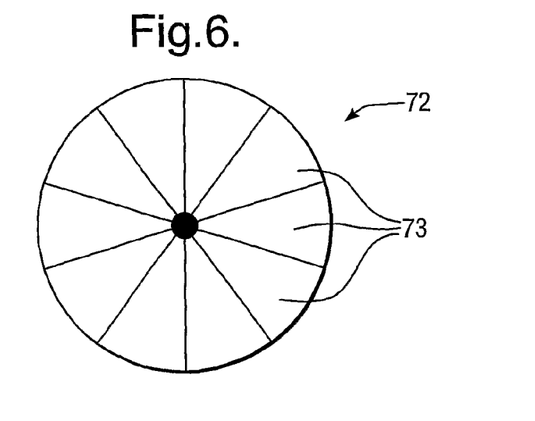
FIG. 6 shows a schematic view of a photodiode.

FIG. 6 shows a plane view of the photovoltaic device along the direction in which light will be incident upon the device (that is, along the axial direction with respect to FIGS. 4 and 5).

The photovoltaic device 72 is substantially circular, each cell 73 being shaped as an angular segment. The cells each have front and back contacts, and are connected in series, such that the front contact of one cell is connected to the back contact of an adjacent cell. Typically, the photovoltaic device 72 will be formed by 10 cells.

However, in an alternative embodiment, the power source 70 is a conventional long-life battery, and the photodiode merely acts as a sensor to receive information and monitor the intensity of the incoming light from the head end.

Figure 7:
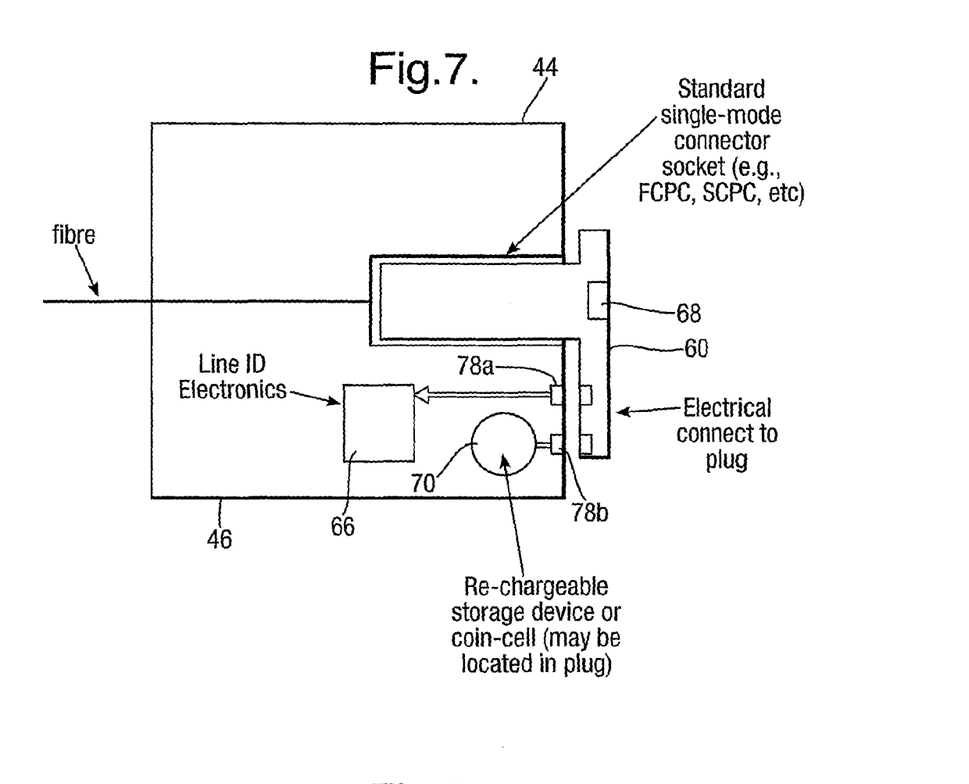
FIG. 7 shows a schematic view of an interface unit with a test device connected thereto in a yet further embodiment; and, FIG. 8 is a graph of the V-I characteristics of a photodiode device.

Not all the electronic circuit 64 of the interface unit 44 need be located within the housing. FIG. 7 shows an embodiment of the interface unit 44 in which the identity chip 66 and the electrical storage device 70 are located within the housing 46 of the interface unit, whereas the controller stage 68 is located in the removable test device 60. The contract region 78 includes separate contacts 78a and 78b on the housing 46, for contacting the identity chip and the electrical storage device respectively (corresponding contacts on the removable test device being provided).

In this embodiment the identity chip is of the type that is passive, that is, one that consumes substantially no power until it is interrogated by the controller stage. One advantage of locating the controller stage 68 in the removable test device

60 is that since the controller stage will normally includes a processor programmed in accordance with the communication protocol used to communicate with the central monitoring unit, if the communication protocol needs to be changed, a new monitoring unit 60 can simply be provided, reducing the need for the housing 46 of the interface unit to be accessed. This could be particularly advantageous for a network operator, as the network operator can simply send by mail replacement removable units to the relevant customer premises, thereby reducing the need for costly on-site visits by an engineer.

The identity chip will preferably be an electronic semiconductor device having a permanent memory, for example a static read only memory (or ROM) formed by a plurality of gated or wired circuits, which circuits are configured according to a (preferably unique) identification data. When the device is read, by applying a probing signal, an output of the device provides the identification data.

However, in another embodiment, the identity chip is a contactless device comprising a semiconductor device and an RF coil (either integrally formed with the semiconductor device or external thereto). The coil is arranged to pick up an RF electromagnetic field, which field is used to read the chip. In such an embodiment, the controller stage 68 and the electrical storage device are each located in the removable test device 60 rather than the interface unit 44.

In one modification to the embodiment of FIG. 7, the ID chip 66 is located in the housing 46, whereas the storage device is located in the. This would allow the storage device to be replaced at the same time as the plug and keeps the cost of the housing as low as possible.

In the above embodiments, each interface unit can be viewed as being located where the ODN terminates, indicating the demarcation point between the ODN and the customer-premises equipment. Thus, each interface unit will be housed within the customer premises, where a customer can easily remove the test device and connect an ONT.

The following additional comments are provided.

At least some of the embodiments relate to the field of optical fibre communications networks. In particular, to future access networks such as Passive Optical Networks which provide fibre all the way between the network operator's central office and the customer's premises. It would be extremely useful to a network operator to be able to perform some basic tests such as; continuity, measure remote optical power levels, and identify network terminations automatically.

With regard to at least some of the embodiments, the general concept is the use of intelligent optical network termination equipment (IONTE) at the remote periphery or network demarcation point. The IONTE could be used when normal communications services are not being supplied to the customer. It would give the network operator the ability to test the network before offering service. It might also provide a means of testing the network to the customer boundary in order to determine if it is the customer premises equipment or the operator's network that is at fault. However, unlike the copper network, electrical power is not provided directly by the access network and needs to be derived by other means. The fibre IONTE can act as an autonomous unit since it does not always require special test signals from the Exchange in order to perform its measurements, in contrast to systems which are designed to transmit their information only when requested. The IONTE can perform its measurements at random intervals and then transmit a short burst of suitably encoded data back to a centralised control system with very low probability of clashing with transmissions from other IONTEs on the same PON.

A further aspect of at least some of the embodiments is to incorporate a permanent unique electronic identity chip within the housing of every IONTE. Thus, once installed in the customer's premises, every network termination will have the capability of supplying its identity that can be read on demand either via the network itself or by a field engineer equipped with a suitable probe.

The Intelligent Optical Network Termination Equipment (IONTE) described here is designed to work on an Access Network. In particular, on optical infrastructure sharing networks such as Passive Optical Networks (PONs) which provide a shared fibre path between the network operator's central office and multiple customer premises. It would be extremely useful for the operators of such networks to be able to perform some basic tests such as; continuity, measure remote optical power levels, and identify the remote network terminations automatically. Furthermore it would also be useful if the IONTE could work independently of the optical transmission systems working over the fibre since this would give the maximum flexibility to perform future service upgrades without impacting the IONTE function. FIG. 1 shows how the IONTE could be incorporated into a future PON network architecture.

FIG. 1 shows the IONTEs at the network demarcation points of a 256-way PON. (This is purely representative of a possible future PON architecture). The IONTEs communicate in an allocated wavelength band (such as for example the test-wavelength window around 1625 nm) with a common intelligent control system. This could be located at the Exchange (Central Office) or at an intermediate location. In FIG. 1, it is shown in the same location as the PON amplifiers and Wavelength Division Multiplexing (WDM) equipment. From this point there would be another connection (not shown) back to some central control and management system shared by many such PONs.

Other components shown in FIG. 1 are 1:8 and 1:32 passive power splitters forming part of the Optical Distribution Network (ODN), the Optical Network Termination (ONT) equipment in the customer premises.

The IONTE should communicate over the fibre path with the common control system. Two means of achieving this are: (i) by employing a low-power light source such as a vertical cavity surface emitting laser (VCSEL) in the IONTE that is designed to operate in the allocated wavelength range; or (ii) by employing a centralised light source and using a reflection modulator in the IONTE. The second method is potentially lower power and also provides a straightforward way of proving downstream communications and synchronisation between the IONTE controller and the IONTEs. However, there is a major drawback since the light has to pass through the ODN in both directions—leading to significant attenuation when the split-level of the PON is large. This problem is compounded by the finite extinction ratio of the reflection modulators causing interfering signals from the other (N-1) IONTEs. Nevertheless, such an approach could work with small split PONs such as for example the 32-way GPON legacy system shown in FIG. 1. (The design of a suitable reflection modulator will be given later.) For larger split PONs, as being envisaged for the future Access Network, the first option is more practicable, but does require a solution that allows the IONTEs to communicate with their common controller. There are two solution to this problem: (a) the first would be to use a dedicated down-stream communication channel between the controller and IONTEs to provide synchronisation; or (b) the second would be to use an asynchronous transmission technique that would either allow messages to overlap (using techniques such as code-division or frequency-division multiple access), or by reducing the probability of message collisions by using infrequent randomly timed short data bursts. The asynchronous solutions are preferred since they do not require a downstream receiver, and will therefore reduce power consumption at the IONTE. The short data burst method has the added advantage of simplicity and requires less processing power—leading to yet further reductions in power consumption.

The optical path specification for PONs is set by international standards bodies such as the ITU (International Telecommunications Union). Critical parameters in PON standards are the operating wavelength plan, transmitter/receiver power levels, and reflection coefficients. A device placed in the optical path should not interfere with these parameters, therefore, the IONTE should use dedicated wavelengths (not employed by the PON) and introduce negligible additional loss. At least some of the embodiments provide a pluggable solution takes into account these requirements.

FIG. 7 shows a ONTE wall socket containing a unique line identification device (line ID) such as an electronic identity chip (similar chips are used in smart cards and animal ID tagging). The line ID chip consumes no power until it is interrogated by some external probe from which it draws power. The bare wall socket also contains a standard optical connector (possibly with dust cover) and may also contain a long-life battery such as a "coin-cell" or other energy storage device for use by an IONTE plug. It might also contain one or more of various types of energy scavenging devices such as solar cells, piezo-electric vibration transducers, etc (not shown).

When the customer has service their ONT would be plugged into the ONTE and it would appear just like any other form of optical connector with minimum insertion loss and complete transparency to the information being carried. However, when an ONT is not connected, then a small removable I-ONTE plug, as shown in FIGS. 3-5, would be fitted instead. This situation might arise on new developments (so called "green field sites") where fibre infrastructure is pre-installed, but before customers take service. It could also occur when customers move premises and take their ONT with them. When the IONTE plug is not required it could either be 'parked' in a spare connector.

The IONTE plug shown in FIG. 4 is based on a standard single-mode fibre connector. It comprises connector ferrule, lens to focus light from the VCSEL onto the fibre end via a wavelength splitting filter such as a thin-film-filter (TFF) placed at an angle, and a photo-voltaic power converter or photodiode. The TFF allows up-stream light from the VCSEL to be wavelength multiplexed over the down-stream light from the PON. The IONTE plug also houses the ultra-low-power electronics and connection means to the ID chip in the IONTE socket. It might also contain a long-life battery or other power storage device.

The basis operating principle of the IONTE plug is as follows: Downstream light from the PON is routed via the TFF to the photovoltaic power converter or photodiode—either of which can be arranged to give a measure of the amount of optical power emerging at the customers' end of the network. This power measurement could be quite coarse simply to give a go/no-go indication based on total received power, or be divided into a range of power bands, or it might even be split into wavebands to give readings for the different types of PON connected to the ODN. These measurements would then be combined with the IONTE sockets ID (and status) information for transmission back to the IONTE control system using low-duty-cycle asynchronous data bursts. Upstream transmission is accomplished using a VCSEL which operates in a dedicated IONTE transmission waveband. The upstream line code being chosen to minimise data corruption resulting from collisions and also to minimise IONTE power consumption. Each IONTE behaves as an autonomous unit that transmits its line ID, status, and power measurement data in short bursts at random intervals. The IONTE status information might include occasional updates on 'battery' voltage, housing temperature, and the result of self diagnostic checks. The IONTE plug might also be programmed to detect when it has been removed from its socket and for how long and then transmit this information at periodic intervals for a short period when it is re-connected. (This would allow on-demand testing by either the customer or an engineer disconnecting/reconnecting the plug.)

The IONTE plug shown in FIG. 4 is suitable for future large split PONs since it employs its own light source. However, for smaller split PONs such as the 32-way GPON systems being proposed for deployment in 2008, a simple reflection modulator could be used as shown in the plug design in FIG. 5.

FIG. 5 shows a plug employing a surface reflection modulator such as a ferro-electric liquid crystal cell followed by reflection filter. This would result in polarisation modulation that could be converted to intensity modulation at the central controller. Alternatively, a wide range of alternative surface modulator technologies could be used with equal effect and low power consumption. Apart from this, the operating principle is identical to that described previously. However, as this scheme inherently requires a centralised light source, it would be straightforward to incorporate synchronisation information and allow each IONTE to be addressed on demand.

In the embodiment of FIG. 4, the PV converter which is arranged to perform two functions: (i) to give a measure of \ZxAX amount of optical power emerging at the customers' end of the network; and (ii) to develop sufficient voltage 'V' and time-averaged current 'I_ave' to drive the IONTE electronics. The current demanded by the electronics will vary with time, being highest for the short periods when the laser is being driven with the burst-mode transmissions. The time averaged power (V×I_ave) delivered by the photovoltaic converter should be equal to or larger than the time averaged power required by the electronics (including laser). Clearly, some form of energy storage device (such as a storage capacitor or rechargeable battery) is required to accumulate charge during the quiescent periods between burst transmissions. The most efficient way of achieving optical powering with the near constant very low intensity light emerging from the PON is to employ a multi-cell PV converter (see FIG. 3). This should be designed to deliver the required output voltage 'V', and average current I_ave, at the optimum power conversion point (see FIG. 4).

The PV power converter shown in FIG. 6 is based on 10 serially connected photodiodes arranged in a 'pie-like' structure in order to give near uniform illumination, hence photocurrent, in each section when light from the end of the PON is imaged onto it. In our application the PV is designed for operation in the down-stream wavelength bands used on PONs. PV Device parameters, suitable for a PON operating ~1.5 um with output light levels of ~16 uW (or −18 dBm) are listed in the Table 1.

TABLE 1

| Parameter | Value | Comments |
|---|---|---|
| Material | InGaAs/InP | Semi-insulating InP substrate |
| Diode saturation current | $10^{-10}$ A | Good quality material |
| Responsivity | 1 A/W | At ~1.5 um |
| Optical power | 16 uW | From end of PON |
| Number of cells | 10 | Pie sections connected in series |
| Fill factor | 75% | Gaussian beam weighted |
| Short circuit current | $1.2 \times 10^{-6}$ A | |
| Open circuit voltage | 0.24 V/cell | |
| Series resistance | <500 Ohms/cell | |
| V at max power | 1.8 V | |
| I at max power | 1.1 uA | |
| Conversion efficiency | ~12% | Overall optical to electrical power |

The above parameters were derived through a process of iteration using the well known diode equations. The resulting V,I curve is shown in FIG. 4 from which it can be seen that the maximum power conversion efficiency occurs at an output voltage of ~1.8V and at a current of ~1.1 uA—giving a maximum electrical output power of just under 2 uW.

Ultra-low-power electronics with operating voltages of 1.8 v or lower and quiescent (or sleep-mode) current consumption well below 1 uA are known—see for example: Texas Instruments MSP430 micro-controller family; and Amtel's picoPower technology.

In summary, some aspects of the embodiments relate to: exploiting the unused light emerging from the end of a fibre network such as a PON to provide power to electronic equipment used to provide network status information; using a multi-cell photovoltaic converter based on a pie-structure and using an annular focusing arrangement to avoid power-wastage in the central dead-spot; using the same photovoltaic converter to measure the received optical power level for diagnostic testing purposes as part of a self powered IONTE; realising that low-power photovoltaic converters, connected to power storage devices, are capable of powering emergent ultra-low-power electronic processing and low-power laser sources such as VCSELs for applications in self-powered optical network termination equipment.

At least one of the above embodiments can be described as relating to the testing a passive optical network having a head end and a plurality of terminals, which terminals are connected to the network at a respective plug and socket arrangement located at customer premises. A test device is provided having a standard plug for connection in place of a terminal in the socket of the relevant customer premises. An identification device is provided in the socket. The test device is arranged to (i) read the identity of the identification device and (ii) test the line and transmit a result to the head end together with the identity so that the line to the customer premises can be tested remotely. When the line has been tested, the test device can be removed. Because the test device uses an existing connection, the optical (insertion) loss is reduced.

What is claimed is:

1. A testing system comprising:
a connector apparatus for releasably connecting an optical network to a terminal unit, the connector apparatus comprising a first connector in a first configuration arranged to releasably engage with cooperating connector in a second configuration, the connector apparatus having an identifier associated therewith, and an identifier circuit for providing an identification signal, which identification signal is indicative of the identifier associated with the connector apparatus; and
a test device that is releasably connectable to the connector apparatus, the test device being operable in use with the connector apparatus to measure at least one characteristic of an optical signal from the optical network, and to transmit a test signal to a monitoring unit in the optical network, which test signal includes an indication of the measured characteristic(s) and an indication of the identifier associated with the connector wherein each of the terminal unit and the test device has a connector arranged according to second configuration.

2. A testing system as claimed in claim 1, wherein the or a measured characteristic is an indication of the optical power of the optical signal from the optical network.

3. A testing system as claimed in claim 1, wherein the connector apparatus has a common connector region for interchangeably connecting with a selected one of the terminal unit and the monitoring device.

4. A testing system as claimed in claim 1, wherein the test device has an electronic circuit for encoding the test signal.

5. A testing system as claimed in claim 1, wherein the connector apparatus includes a wall-mountable housing.

6. A testing system as claimed in claim 1, wherein the connectors in the first and second configuration are arranged so as to form an optical connection.

7. A testing system as claimed in claim 1, wherein the testing system is arranged to transmit test signals at random intervals.

8. A communications system including: a testing system as claimed in claim 1; and a terminal unit, the terminal unit having a connector arranged according to the second configuration.

9. A communications system as claimed in claim 1, wherein the communications system has: an operational state in which the terminal unit is connected to the first connector; and, a test state in which the terminal unit is removed from the first connector and the test device is connected to the first connector in place of the terminal unit.

10. A communications system as claimed in claim 1, wherein the terminal is arranged to transmit data in burst according to a scheduling instruction.

11. A communications network including plurality of testing systems as claimed in claim 1, wherein the communications network includes the optical network, and wherein the optical network is arranged to broadcast optical signals to each of the testing systems.

12. A testing system as claimed in claim 1, wherein the test device includes a photovoltaic converter for converting at least a portion of the optical signal to electrical power to power another portion of the test device.

13. A testing system as claimed in claim 1, wherein the connector apparatus includes an energy storage device.

14. A method of operating a testing system comprising testing an optical network arranged to broadcast optical signals to a plurality of network connector devices, the method comprising:
receiving an optical signal at a connector device;
measuring one or more characteristics of the optical signal using a test device;
converting optical power in the optical signal into electrical power;
powering the test device with the converted optical power;
using connector apparatus to releasably connect the optical network to a terminal unit, the connector apparatus comprising a first connector in a first configuration arranged to releasably engage with a cooperating connector in a second configuration, the connector apparatus having an identifier associated therewith, and an identifier circuit for providing an identification signal to a monitoring unit in the optical network, which identification signal is indicative of the identifier associated with the connector apparatus; and releasably connecting a test device to the connector apparatus, the test device being operable in use with the connector apparatus to measure the one or more characteristics of the optical signal from the optical network, and to transmit a test signal to the monitoring unit in the optical network, which test signal includes an indication of the measured characteristic(s) and an indication of the identifier associated with the connector apparatus wherein each of the terminal unit and the test device has a connector arranged according to the second configuration.

15. A method according to claim 14 including removal of a plug of a terminal unit from the socket of the connector apparatus prior to plugging the test device into the socket of the connector apparatus.

\* \* \* \* \*